US007004301B2

(12) United States Patent
Brixius et al.

(10) Patent No.: US 7,004,301 B2
(45) Date of Patent: Feb. 28, 2006

(54) TRANSPORT SYSTEM FOR ADVANCING CONTAINERS, AND CURVE SECTION OF SUCH A TRANSPORT SYSTEM

(75) Inventors: Wolfgang Brixius, Neunkirchen A.Br (DE); Dominik Gräfer, Dortmund-Wellinghofen (DE); Albrecht Hoene, Lappersdorf (DE)

(73) Assignee: Siemens Aktiengesellschaft, München (DE)

(*) Notice: Subject to any disclaimer, the term of this patent is extended or adjusted under 35 U.S.C. 154(b) by 14 days.

(21) Appl. No.: 10/789,195

(22) Filed: Feb. 27, 2004

(65) Prior Publication Data

US 2004/0168892 A1 Sep. 2, 2004

(30) Foreign Application Priority Data

Feb. 27, 2003 (DE) ................................ 103 08 657
Apr. 4, 2003 (DE) ................................ 103 15 505

(51) Int. Cl.
*B65G 25/00* (2006.01)

(52) U.S. Cl. .............................. 198/465.2; 198/836.1; 198/787; 198/370.08

(58) Field of Classification Search .......... 198/370.08, 198/465.1, 465.2, 787, 789, 850–853, 836.1
See application file for complete search history.

(56) References Cited

U.S. PATENT DOCUMENTS

| 5,062,368 | A | * | 11/1991 | Sticht et al. | .............. | 198/465.1 |
| 5,538,127 | A | * | 7/1996 | Becker et al. | .......... | 198/370.08 |
| 5,911,306 | A | * | 6/1999 | Ferrari | .................... | 198/836.1 |
| 6,540,064 | B1 | * | 4/2003 | Bodewes et al. | ........ | 198/465.1 |

FOREIGN PATENT DOCUMENTS

| DE | 195 13 738 A1 | 10/1995 |
| DE | 197 07 321 A1 | 8/1998 |
| DE | 199 00 461 A1 | 7/2000 |
| EP | 1 094 018 A1 | 4/2001 |
| FR | 2 705 327 | 11/1994 |
| FR | 2 776 641 | 10/1999 |

* cited by examiner

*Primary Examiner*—Joe Dillon, Jr.
(74) *Attorney, Agent, or Firm*—Henry M. Feiereisen

(57) ABSTRACT

A transport system for advancing containers includes a curve section for defining a curved transport path which is defined by a curve radius, and a driving and guiding assembly for advancing and guiding a container along the transport path. The driving and guiding assembly has support elements, which support the underside of the container, and is constructed to bear upon at least one of the sidewalls, at least along portions thereof, in a force-locking or form-fitting manner for propulsion of the container. The container has an underside formed with two longitudinal sidewalls extending mirror-symmetrically and curved outwardly or inwardly at a radius, which corresponds to the curve radius, such that a distance between the sidewalls is at a maximum or minimum in mid-section of the sidewalls.

21 Claims, 7 Drawing Sheets

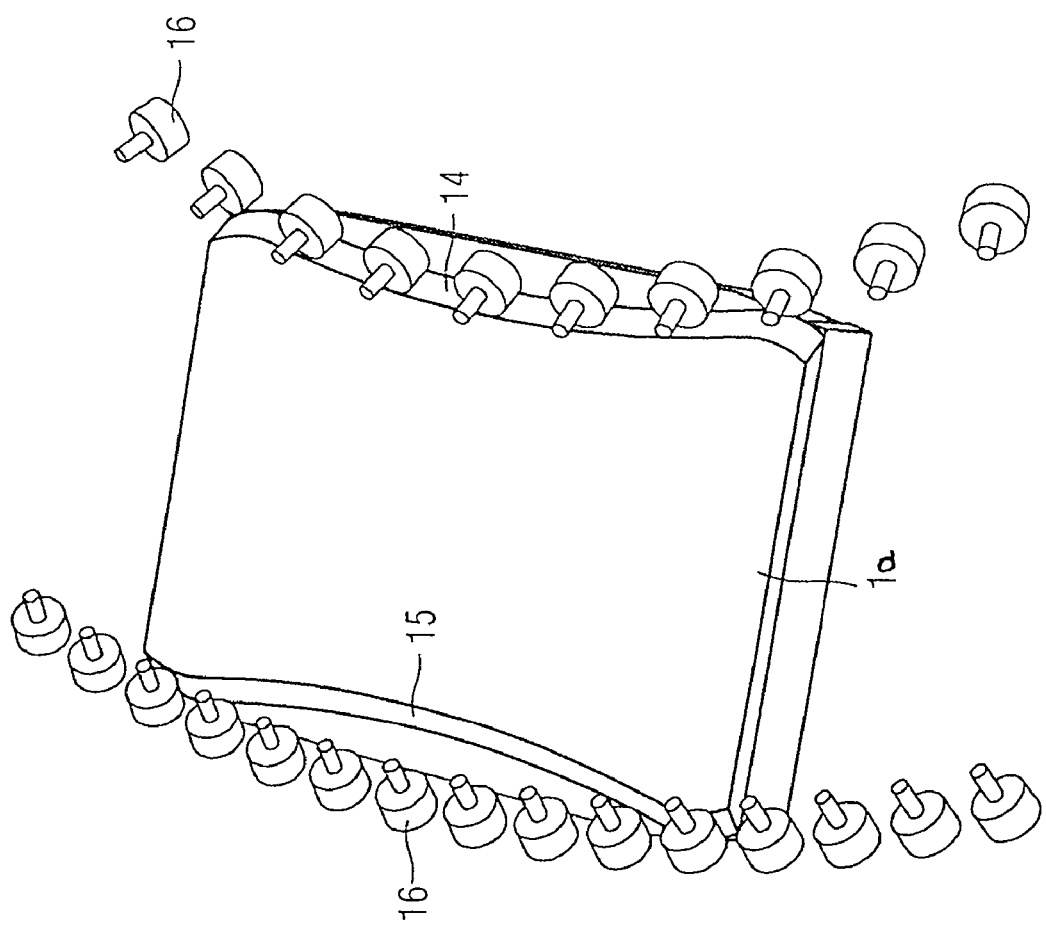

US 7,004,301 B2

TRANSPORT SYSTEM FOR ADVANCING CONTAINERS, AND CURVE SECTION OF SUCH A TRANSPORT SYSTEM

CROSS-REFERENCES TO RELATED APPLICATIONS

This application claims the priority of German Patent Applications, Serial Nos. 103 08 657.9, filed Feb. 27, 2003, and 103 15, 505.8, filed Apr. 4, 2003, pursuant to 35 U.S.C. 119(a)–(d), the disclosure of which is incorporated herein by reference.

BACKGROUND OF THE INVENTION

The present invention relates, in general, to a transport system for transport of containers, in particular to an airport baggage handling system, and more particularly to a curve section for use in such a transport system.

Airport baggage handling systems are known by which containers or trays travel along a transport path, including curve sections. An example is described in German patent publication DE 197 07 321 A1. The containers are moved and guided by flat conveyor belts which circulate continuously and are routed about deflection rollers. The conveyor belt may also be constructed as toothed belt and bears upon at least one container side in a force-locking or form-fitting manner to provide propulsion of the container.

Oftentimes, the container is advanced to a curve section of the transport system by means of two conveyor belts of a straight conveyor and picked up at the entry to the curve by pairs of rollers which are disposed on an axle to a cone to compensate speed differentials between outer and inner radii of the curve. The outer roller pairs and the incoming belts are normally disposed in spaced-apart relationship at a distance which corresponds to the container width. As a consequence, the speed differentials are increased and result in an undesired relative movement between the containers, the incoming belts and the roller pairs. To prevent the relative movement, it has been proposed to use forced guides at the container underside as well as centrally situated guide rails on which guide rollers mounted on the container roll. Hereby, the contents of the container apply, however, additional transverse forces.

It would therefore be desirable and advantageous to provide an improved transport system for advancing containers to obviate prior art shortcomings and to prevent the afore-described relative movement.

SUMMARY OF THE INVENTION

According to one aspect of the present invention, a transport system for advancing containers includes a curve section for defining a curved transport path which is defined by a curve radius, a container having an underside formed with two longitudinal sidewalls extending in mirror-symmetric relationship and curved at a radius, which corresponds to the curve radius, such that a distance between the sidewalls is at a limit in mid-section of the sidewalls, and a driving and guiding assembly for advancing and guiding the container along the transport path, with the driving and guiding assembly including support elements, which support the underside of the container, and constructed to bear upon at least one of the sidewalls, at least along portions thereof, in a force-locking or form-fitting manner for propulsion of the container.

According to another feature of the present invention, the sidewalls may be curved outwardly so that the distance between the sidewalls is at a maximum in mid-section of the sidewalls. As an alternative, the sidewalls may be curved inwardly so that the distance between the sidewalls is at a minimum in mid-section of the sidewalls.

According to another feature of the present invention, the driving and guiding assembly may include a roller assembly having rotatable rollers arranged along a curved line in coincidence with the curved transport path. Suitably, the rollers are arranged on both sides of the curved line and roll on the sidewalls indirectly, at least along portions thereof.

According to another feature of the present invention, the sidewalls may bound a groove-shaped passageway formed in the underside of the container and extending in transport direction, whereby the sidewalls extend mirror-symmetrically and are curved outwardly so that the distance between the sidewalls is at a maximum in mid-section of the sidewalls, with the driving and guiding assembly engaging in the passageway and bearing upon the sidewalls, at least along portions thereof. In this way, the containers are guided with little speed differentials between outer and inner radii.

According to another feature of the present invention that allows a simple construction for operating the roller assembly, the driving and guiding assembly may have a driving belt, with the roller assembly having a plurality of inner rollers in relation to the curve line which roll freely rotatable directly on the sidewalls, and a plurality of outer rollers which propel the driving belt, with the driving belt having an outer side bearing upon a confronting one of the sidewalls in a force-locking or form-fitting manner. In order to realize an even and self-reinforcing abutment of the driving and guiding assembly, the outer rollers are swingably mounted on a lever arm for rotation about an axis, with the lever arm swinging about a pivot axis which extends in parallel relationship to the axis of the rollers between the outer rollers and the inner rollers.

The effectiveness of the propulsion can be enhanced by disposing fixed secondary rollers along the curve line between the outer rollers and the inner rollers in such a manner that the driving belt has a load strand which runs in a wavy shape along the secondary rollers, wherein the outer rollers are pushed about the pivot axis to the outside during operation of the driving belt to brace the container between the inner rollers and an outer side of the driving belt. As an alternative, the sidewalls may bound a web-like projection formed on the underside of the container and extending in transport direction, whereby the sidewalls extending mirror-symmetrically and are curved inwardly so that the distance between the sidewalls is at a minimum in mid-section of the sidewalls.

According to another feature of the present invention, the driving and guiding assembly may have a driving belt, with the roller assembly having a plurality of inner rollers in relation to the curve line which roll directly on the sidewalls, and a plurality of outer rollers which propel the driving belt, with the driving belt having an outer side resting against a confronting one of the sidewalls in a force-locking or form-fitting manner, or vice versa. In this way, a simple and safe drive is realized.

According to another feature of the present invention, the support elements may be constructed as ball rollers or sliding surfaces so as to reduce encountered transverse forces.

According to another aspect of the present invention, a curve section for a transport system for advancing containers includes a curved track for defining a curved transport path which is defined by a curve radius, and a driving and guiding assembly for advancing and guiding a container along the transport path, with the driving and guiding assembly including support elements, which support the underside of the container, and constructed to bear upon a longitudinal sidewall of the container, at least along portions thereof, in a force-locking or form-fitting manner for propulsion of the container.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 7 is a perspective view of still another embodiment of a curve section according to the present invention as kinematic reversal of the curve section of FIG. 4.

DETAILED DESCRIPTION OF PREFERRED EMBODIMENTS

Figure 1:
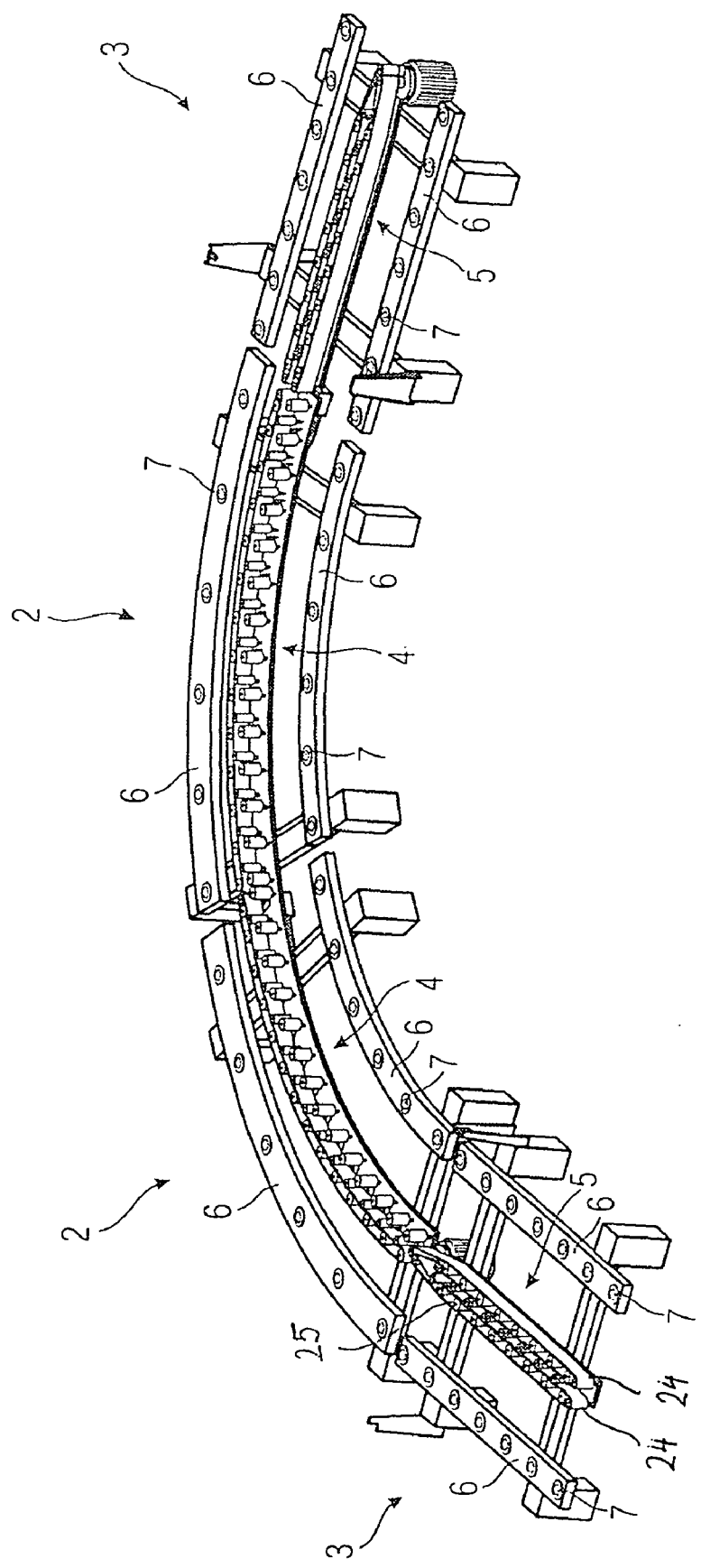
FIG. 1 is a top perspective view of a portion of a transport system according to the present invention with a curved transport path realized by two curve sections.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of three applications filed on the same day. These applications deal with related inventions. They are commonly owned and have partly different inventive entities. These applications are unique, but incorporate the other by reference. Accordingly, the following U.S. patent applications are hereby expressly incorporated by reference: "Container Transport System and Container for Transport of an Article" and "Container Transport System".

Turning now to the drawing, and in particular to FIG. 1, there is shown a top perspective view of a portion of a transport system according to the present invention for use, for example, as an airport baggage handling system. The transport system includes a curved track to define a transport path constructed for transport of containers 1, shown in more detail in FIGS. 3, 4, 6 and 7. The curved track is comprised of two curve sections, generally designated by reference numeral 2. Of course, the curve sections 2 may also be constructed in single-piece configuration. The curve sections 2 are disposed immediately following one another, with a straight conveyor 3 positioned upstream of one curve section 2 and a straight conveyor 3 positioned downstream of the other curve section 2. The straight conveyors 3 are each provided in mid-section with a driving and guiding assembly 4 whereas the curve sections 2 are each provided in mid-section with a driving and guiding assembly 5. Disposed on both sides of the driving and guiding assemblies 4, 5 is a support assembly in the form of support plates 6, with the containers 1 being supported with their underside through intervention of ball rollers 7 upon the support plates 6.

The driving and guiding assembly 5 of the straight conveyors 3 includes two driving belts 24 which are respectively guided by cylindrical rollers 25. A specific construction and manner in which the driving and guiding assembly 5 is operatively and functionally incorporated into the straight conveyor 3 of the present invention for interaction with the containers 1 is fully described in the afore-mentioned commonly owned patent application, entitled "Container Transport System", as filed on the same day.

Figure 2:
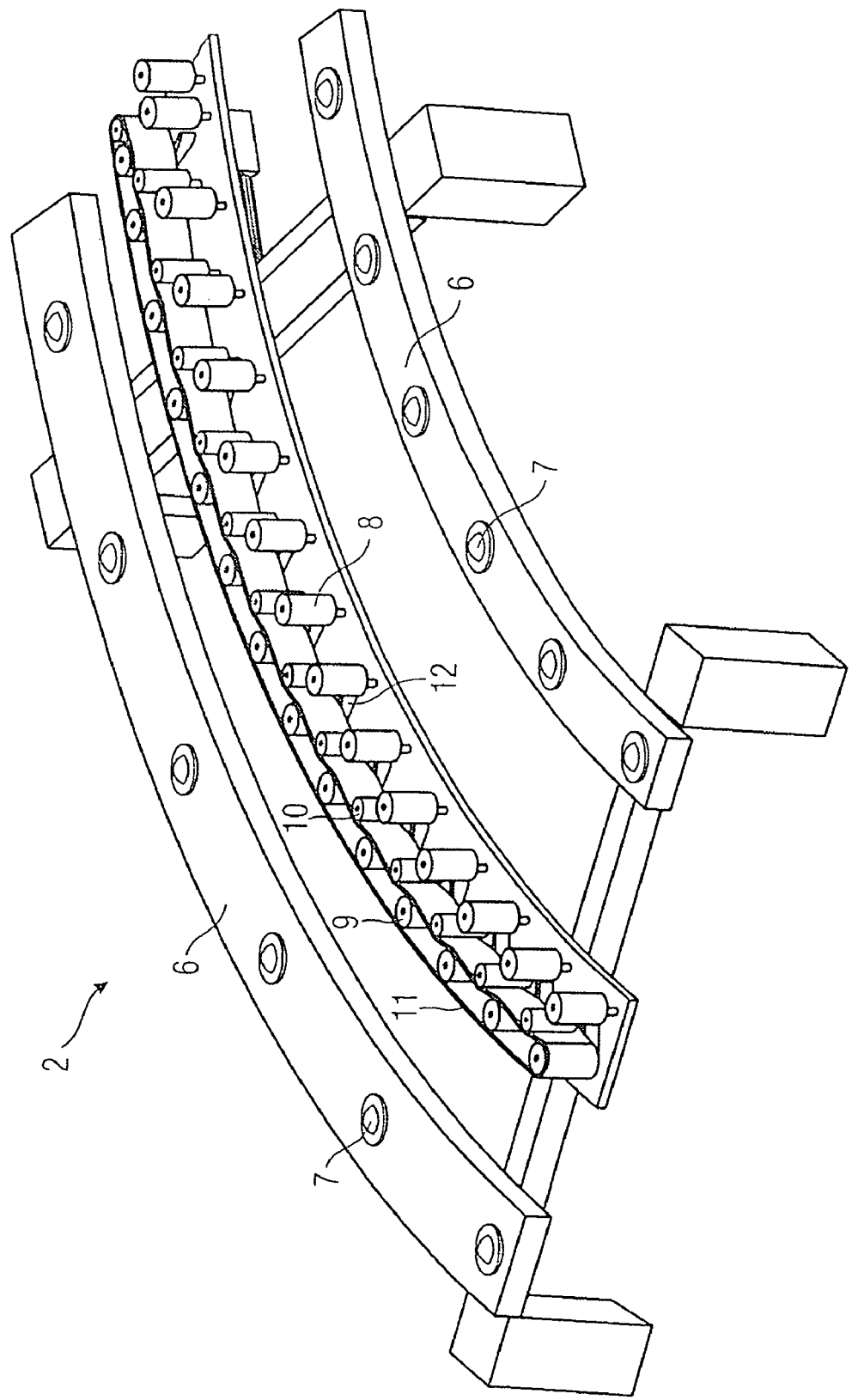
FIG. 2 is a top perspective view of one curve section of FIG. 1 on an enlarged scale.

Turning now to FIG. 2, there is shown a top perspective view of one curve section 2 of FIG. 1 on an enlarged scale. The driving and guiding assembly 4 includes three rows of rollers 8, 9, 10, which are disposed in parallel relationship to follow a direction of an imaginary curve line of the curved transport path, and a driving belt 11. The rollers 8 extend hereby on one side of the curve line to constitute inner rollers, and the rollers 9 extend on the other side of the curve line to constitute outer rollers, whereas the rollers 10 are secondary rollers which are placed directly on the curved line between the rollers 8, 9. The rollers 8 are freely rotatably supported while the rollers 9 guide and drive the continuously running driving belt 11. In addition, the outer rollers 9 are each swingably supported on a lever arm 12 which is defined by a pivot axis in parallel relationship to the rotation axis of the associated roller 9 and disposed between the rollers 9 and the inner rollers 8. The secondary rollers 10 are so disposed along the curve line that the outer rollers 9 swing about the pivot axis, when the driving belt 11 is moved and are pushed outwards so as to brace the container 1 between the inner rollers 8 and the outwardly directed outer side of the driving belt 11.

Figure 3:
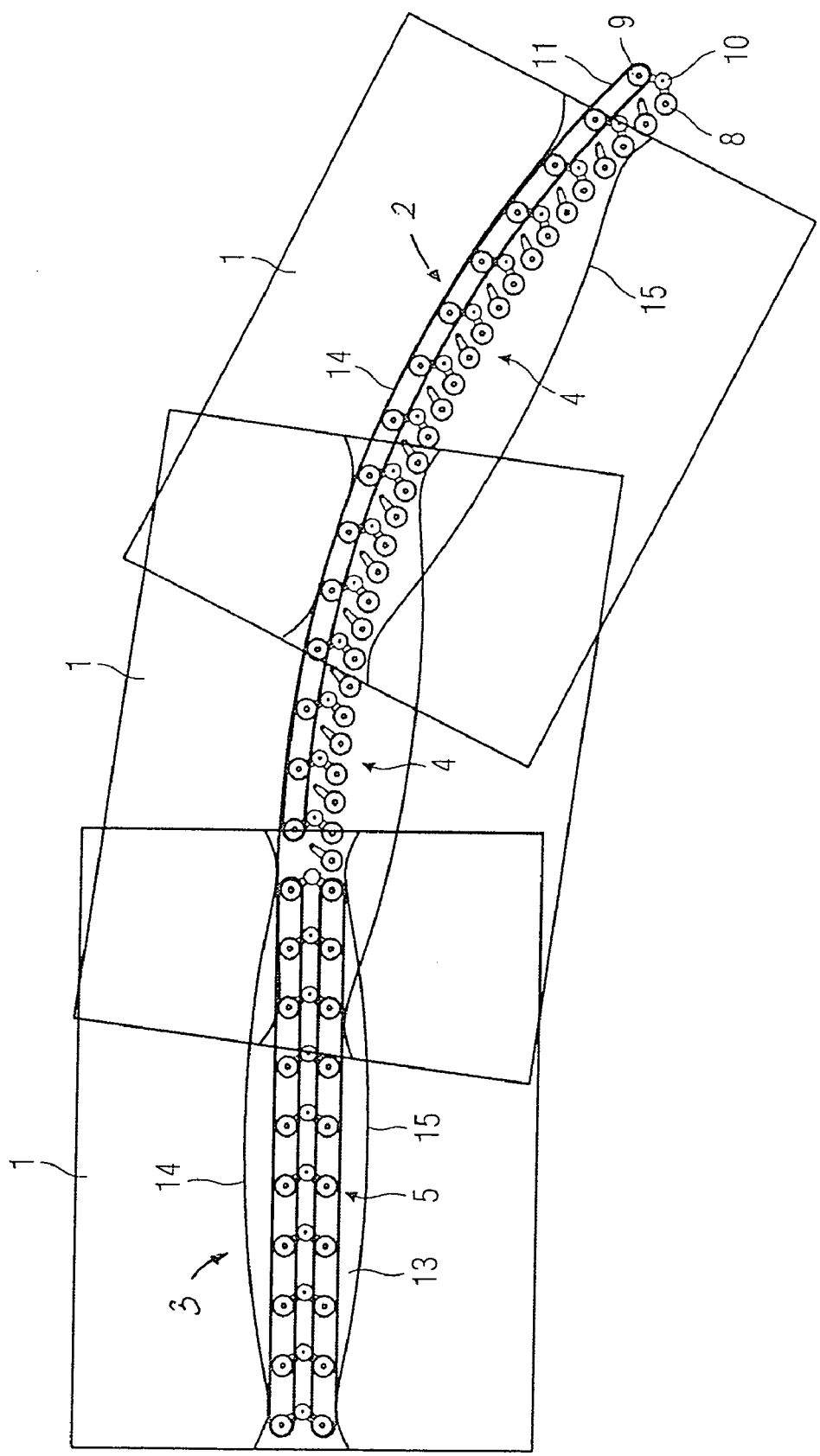
FIG. 3 is a schematic illustration of the curve section from below, showing a container in three positions during travel along the transport path.

Turning now to FIG. 3, there is shown a schematic illustration of a straight conveyor 3 and the following curve section 2, depicting a container 1 in three positions at three different times during travel along the transport path. The container 1 is formed on the underside with a groove-shaped passageway 13 bounded by longitudinal sidewalls 14, 15 which are disposed mirror-symmetrically and curved outwards so that the sidewalls 14, 15 have a greatest distance approximately in mid-section thereof. The driving and guiding assembly 4 of the straight conveyor 3 and the driving and guiding assembly 5 of the curve section 2 engage the passageway 13 and bear respectively upon the sidewalls 14, 15, at least along portions thereof, in a force-locking manner, thereby realizing a controlled propulsion of the container 1. The sidewalls 14, 15 extend hereby in correspondence to the course of the rollers 8, 9 and the driving belt 11 perpendicular to the bottom underside f the container 1.

Figure 4:
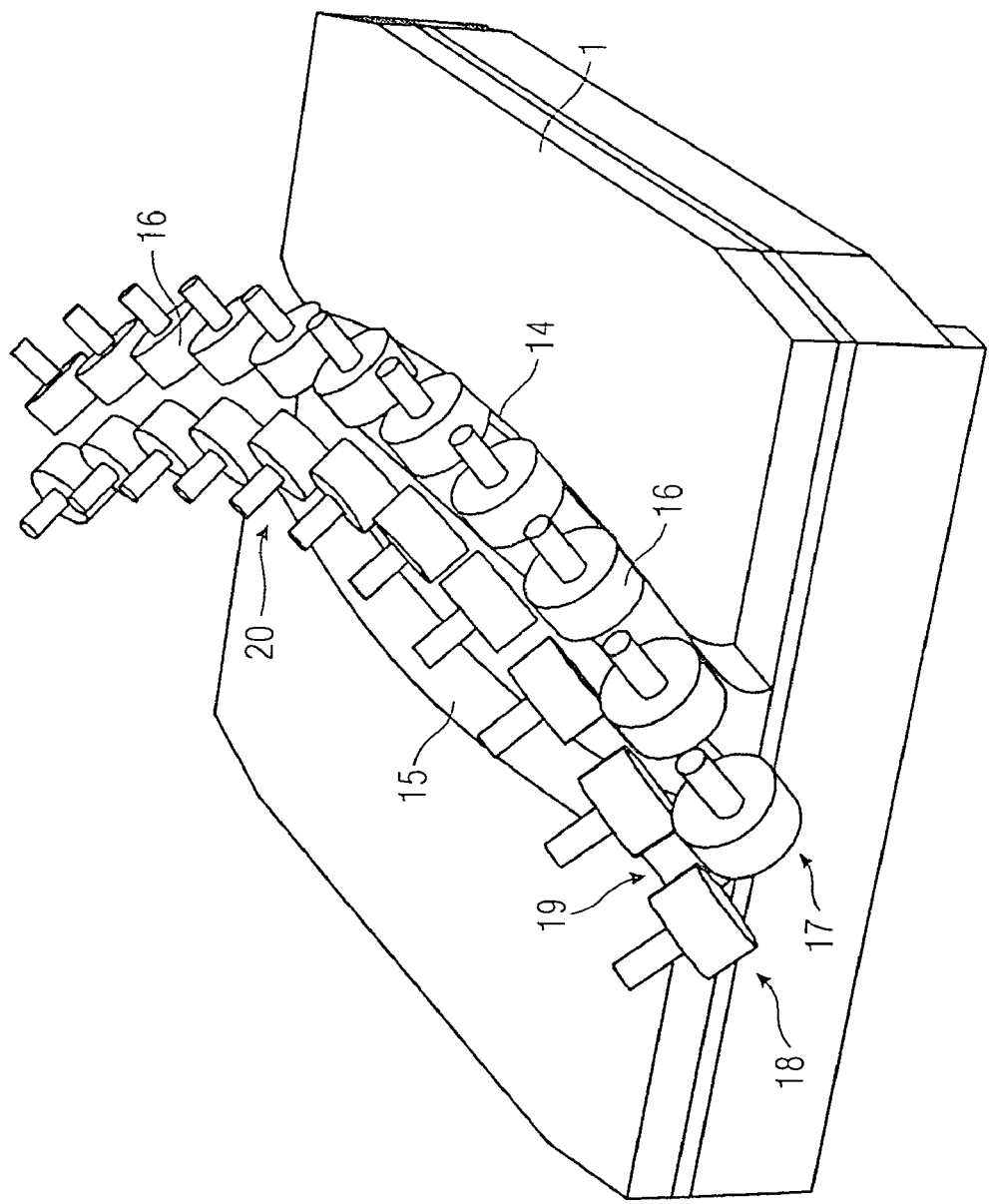
FIG. 4 is a perspective view of another embodiment of a curve section according to the present invention.

FIG. 4 shows a perspective view of another embodiment of the curve section 2 for a container 1. In this embodiment, the sidewalls 14, 15 of the container 1 extend slantingly in relation to one another in such a manner that the groove-shaped passageway 13 opens up to the outside. The driving and guiding assembly 5 of the curve section 2 is here realized by bevel rollers 16 disposed in two parallel roller tracks 17, 18. In the curved zone of the curve section 2, the roller tracks 17, 18 bear against the sidewalls 14, 15 in such a manner that the roller track 17 bears almost completely against the sidewall 14 whereas the roller track 18 bears only against short sidewall sections 19, 20.

Figure 5:
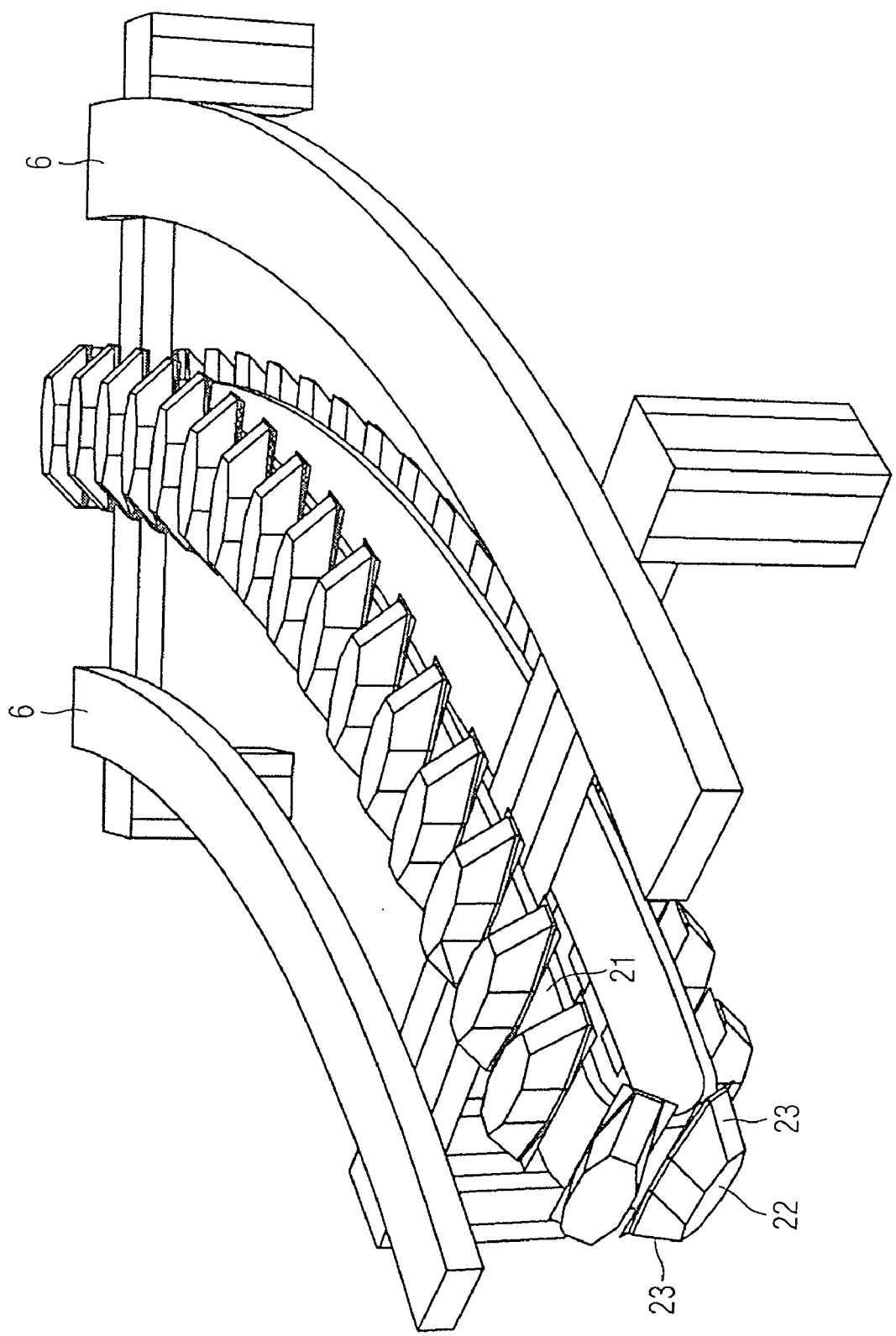
FIG. 5 is a perspective view of yet another embodiment of a curve section according to the present invention.
Figure 6:
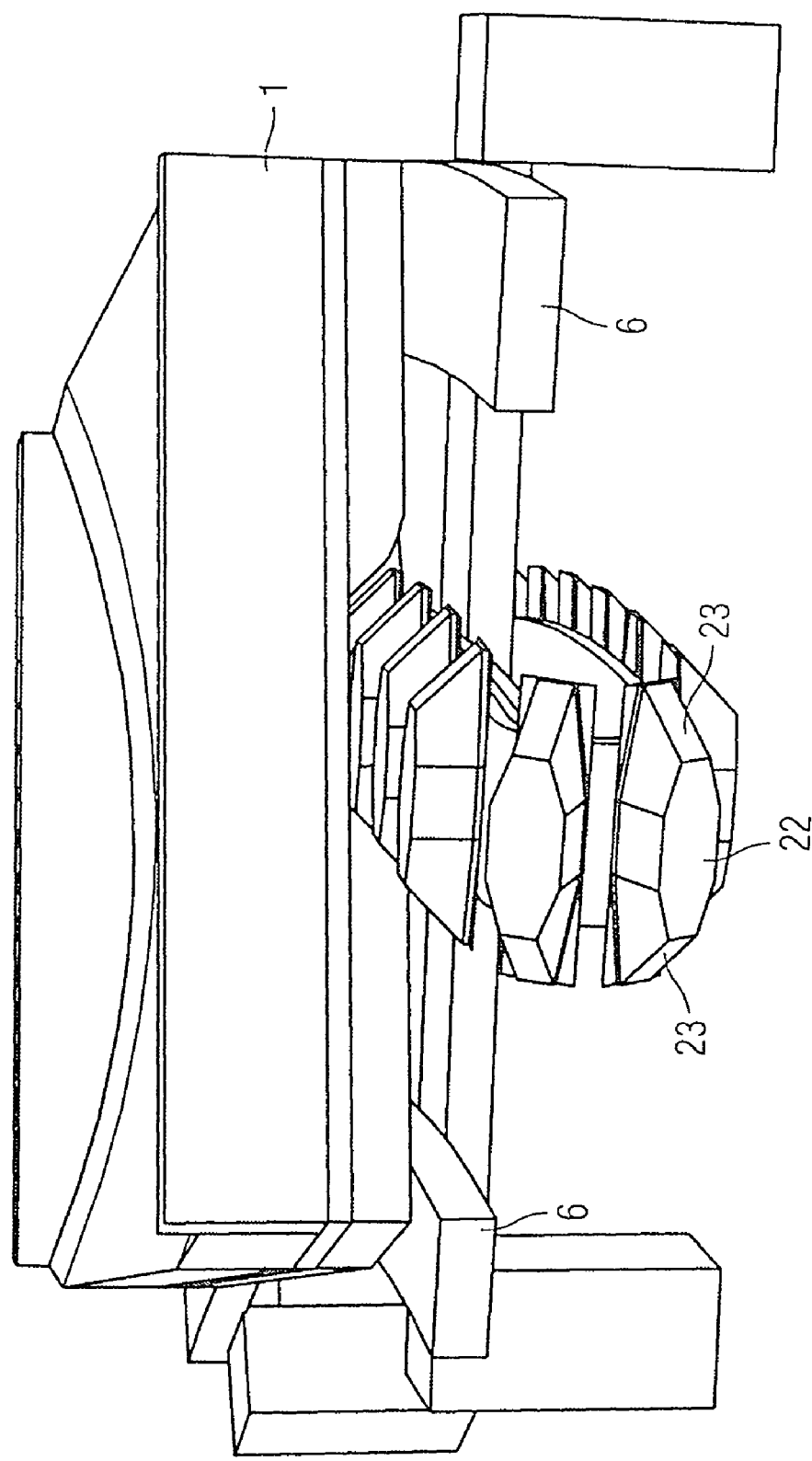
FIG. 6 is a perspective illustration of the curve section of FIG. 5 with supported container.

FIGS. 5 and 6 show a further embodiment of a driving and guiding assembly which is configured here in the form of a flat-top chain 21 with parallel prisms 22 (or trapezoids). The prisms 22 engage the passageway 13 of the containers 1, as shown in FIG. 6, to guide and advance the containers 1 through frictional engagement with the inclined sidewalls 14, 15 to thereby propel the containers 1, whereby the outwardly directed prism sides 23 rest against the sidewalls 14, 15.

Referring now to FIG. 7, there is shown a kinematic reversal of the of the curve section 2 of FIG. 4. Parts corresponding with those in FIG. 4 are denoted by identical reference numerals and not explained again. The description below will center on the differences between the embodiments. The container 1 is formed here on the underside with a web-like projection 1a which defines on the lateral margins slanted sidewalls 14, 15 for driving and guiding the container 1. Thus, the sidewalls 14, 15 are arranged on both sides of the container 1 in symmetric relationship. Depending on which of the bevel rollers 16 assume the propulsion during travel in the curved section 2, the sidewalls 14, 15 may be curved convexly (not shown) or, as shown in FIG. 7, may be curved concavely, so that the bevel rollers 16 bear upon the container 1 in the inner side or outer side of the curve section.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transport system for advancing containers, in particular of an airport baggage handling system, comprising:
   a curve section for defining a curved transport path which is defined by a curve radius;
   a container having two longitudinal sidewalls extending in mirror-symmetric relationship and curved at a radius, which corresponds to the curve radius, such that a distance between the sidewalls is at a limit in midsection of the sidewalls; and
   a driving and guiding assembly constructed for forced or form-fitting engagement with at least one of the sidewalls of the container, at least along portions thereof to thereby move and guide container along the transport.

2. The transport system of claim 1, wherein the sidewalls are curved outwardly so that the distance between the sidewalls is at a maximum in mid-section of the sidewalls.

3. The transport system of claim 1, wherein the sidewalls are curved inwardly so that the distance between the sidewalls is at a minimum in mid-section of the sidewalls.

4. The transport system of claim 1, wherein the driving and guiding assembly includes a roller assembly having rotatable rollers arranged along a curved line in coincidence with the curved transport path.

5. The transport system of claim 4, wherein the rollers are arranged on both sides of the curved line and roll on the sidewalls indirectly, at least along portions thereof.

6. The transport system of claim 1, wherein the sidewalls bound a groove-shaped passageway formed in an underside of the container and extending in transport direction.

7. The transport system of claim 2, wherein the sidewalls bound a groove-shaped passageway formed in an underside of the container and extending in transport direction, said driving and guiding assembly engaging in the passageway and bearing upon the sidewalls, at least along portions thereof.

8. The transport system of claim 4, wherein the driving and guiding assembly has a driving belt, wherein a first plurality of the rollers are disposed inwards in relation to the curve line and roll freely rotatable directly on the sidewalls, and a second plurality of the rollers are disposed outwards in relation to the curve line and propel the driving belt, with the driving belt having an outer side bearing upon a confronting one of the sidewalls in a force-locking or form-fitting manner.

9. The transport system of claim 8, wherein the roller assembly includes a plurality of lever arms, each of the lever arms swingably supporting a corresponding one of the outer rollers for rotation about an axis, whereby the lever arms and the outer rollers are placed into one-to-one correspondence, said lever arms swinging about a pivot axis which extends in parallel relationship to the axis of the rollers between the outer rollers and the inner rollers.

10. The transport system of claim 8, wherein the roller assembly includes fixed secondary rollers disposed along the curve line between the outer rollers and the inner rollers in such a manner that the driving belt has a load strand which runs in a wavy shape along the secondary rollers, wherein the outer rollers are pushed about the pivot axis to the outside during operation of the driving belt to brace the container between the inner rollers and an outer side of the driving belt.

11. The transport system of claim 3, wherein the sidewalls bound a web-like projection formed on an underside of the container and extending in transport direction.

12. The transport system of claim 4, wherein the driving and guiding assembly has a driving belt, wherein a first plurality of the rollers are disposed inwards in relation to the curve line and roll freely rotatable directly on the sidewalls, and a second plurality of the rollers are disposed outwards in relation to the curve line and propel the driving belt, with the driving belt having an outer side bearing upon a confronting one of the sidewalls in a force-locking or form-fitting manner, or vice versa.

13. The transport system of claim 1, wherein the driving and guiding assembly includes support elements which support an underside of the container and are constructed as ball rollers or sliding surfaces.

14. A curve section for a transport system for advancing containers, comprising:
   a curved track for defining a curved transport path which is defined by a curve radius; and
   a driving and guiding assembly constructed for forced or form-fitting engagement with at least one of the sidewalls of the container, at least along portions thereof to thereby move and guide container along the transport path.

15. The curve section of claim 14, wherein the driving and guiding assembly includes a roller assembly having rotatable rollers arranged along a curved line in coincidence with the curved transport path.

16. The curve section of claim 15, wherein the rollers are arranged on both sides of the curved line to bear upon the sidewall and an opposite further longitudinal sidewall of the container, at least along portions thereof.

17. The curve section of claim 14, wherein the driving and guiding assembly engages in a passageway of the container to bear upon the at least one sidewall.

18. The curve section of claim 14, wherein the driving and guiding assembly has a driving belt, wherein a first plurality of the rollers are disposed inwards in relation to the curve line and roll freely rotatable directly on the sidewall, and a second plurality of the rollers are disposed outwards in relation to the curve line and propel the driving belt, with the driving belt having an outer side bearing upon a confronting further longitudinal sidewall in a force-locking or form-fitting manner.

19. The curve section of claim 18, wherein the roller assembly includes a plurality of lever arms, each of the lever arms swingably supporting a corresponding one of the outer rollers for rotation about an axis, whereby the lever arms and the outer rollers are placed into one-to-one correspondence, said lever arms swinging about a pivot axis which extends in parallel relationship to the axis of the rollers between the outer rollers and the inner rollers.

20. The curve section of claim 18, wherein the roller assembly includes fixed secondary rollers disposed along the curve line between the outer rollers and the inner rollers in such a manner that the driving belt has a load strand which runs in a wavy shape along the secondary rollers, wherein the outer rollers are pressed about the pivot axis to the outside during operation of the driving belt to brace the container between the inner rollers and an outer side of the driving belt.

21. The curve section of claim 14, wherein the driving and guiding assembly includes support elements which support an underside of the container and are constructed as ball rollers or sliding surfaces.

* * * * *